United States Patent [19]

Chang

[11] Patent Number: 5,265,067
[45] Date of Patent: Nov. 23, 1993

[54] METHODS AND APPARATUS FOR SIMULTANEOUS COMPRESSIONAL, SHEAR AND STONELEY LOGGING

[75] Inventor: Shu-Kong Chang, West Redding, Conn.

[73] Assignee: Schlumberger Technology Corporation, New York, N.Y.

[21] Appl. No.: 777,041

[22] Filed: Oct. 16, 1991

[51] Int. Cl.$^5$ .......................... G01V 1/40; G01V 1/14
[52] U.S. Cl. ........................................ 367/31; 367/32; 364/422
[58] Field of Search ............................. 367/31, 32, 75; 364/422

[56] References Cited

U.S. PATENT DOCUMENTS

| | | |
|---|---|---|
| 3,330,375 | 7/1967 | White . |
| 3,475,722 | 10/1969 | White . |
| 3,593,255 | 7/1971 | White . |
| 3,881,168 | 4/1975 | Farr et al. . |
| 4,131,875 | 12/1978 | Ingram . |
| 4,207,961 | 6/1980 | Kitsunezaki . |
| 4,383,308 | 5/1983 | Caldwell . |
| 4,383,591 | 5/1983 | Ogura . |
| 4,419,748 | 12/1983 | Siegfried, II . |
| 4,432,077 | 2/1984 | Alhilali et al. . |
| 4,516,228 | 5/1985 | Zemanek . |
| 4,562,557 | 12/1985 | Parks et al. . |
| 4,594,662 | 1/1986 | Devaney . |
| 4,606,014 | 8/1986 | Winbow et al. . |
| 4,649,525 | 3/1987 | Angona et al. . |
| 4,649,526 | 3/1987 | Winbow et al. . |
| 4,682,308 | 7/1987 | Chung . |
| 4,698,792 | 10/1987 | Kurkjian et al. . |
| 4,700,803 | 10/1987 | Mallett et al. . |
| 4,703,460 | 10/1987 | Kurkjian et al. . |
| 4,709,362 | 11/1987 | Cole . |
| 4,858,198 | 8/1989 | Weissman . |
| 4,875,197 | 10/1989 | Rietsch . |
| 4,932,003 | 1/1990 | Winbow et al. . |
| 4,985,873 | 1/1991 | Eyl et al. . |
| 5,077,697 | 12/1991 | Chang ................................. 367/31 |

FOREIGN PATENT DOCUMENTS 2158581A 11/1985 United Kingdom .

OTHER PUBLICATIONS

C. Morris et al., *A New Sonic Array Tool for Full Waveform Logging*, SPE Paper 13285, presented at the 59th Annual Technical Conference and Exhibit of the SPE, Houston, Tex., Sep. 16–19, 1984.

J. White, *The Hula Log: A Proposed Acoustic Tool*, paper presented at the SPWLA Meeting, 1967.

S. Cohick et al., *Rare-earth iron "square-ring" dipole transducer*, J. Acoust. Soc. Am. 72(2), pp. 313–315, Aug. 1982.

(List continued on next page.)

Primary Examiner—Nelson Moskowitz
Attorney, Agent, or Firm—Marc D. Foodman; Bruce D. Riter; Leonard W. Pojunas

[57] ABSTRACT

Methods and apparatus are described for simultaneously acquiring time-domain (e.g., compressional) and frequency-domain (e.g., monopole Stoneley and/or dipole shear) borehole logs which are separated by frequency filtering. Monopole (Stoneley) data and dipole (shear) data are acquired simultaneously using discrete-frequency sonic emission, preferably at distinct frequencies to avoid cross-mode interference. A preferred embodiment combines discrete-frequency dipole sonic emission at low frequency (up to 5 kHz) to log formation shear wave, high frequency (5 to 30 kHz) time-domain monopole emission with first-motion detection to log formation compressional wave, and discrete-frequency monopole emission at low frequency (below 5 kHz) to log borehole Stoneley wave. The measurements of compressional, shear and Stoneley can be transmitted uphole using a small telemetry bandwidth. Benefits include higher logging speed, acquisition of all three measurements in a single logging run, real-time acquisition and processing of the three measurements, and a reduced telemetry load which allows a tool making the three measurements to be combined with other logging tools.

44 Claims, 9 Drawing Sheets

OTHER PUBLICATIONS

A. Harrison et al., *Acquisition and Analysis of Sonic Waveforms from a Borehole Monopole and Dipole Source for the Determination of Compressional and Shear Speeds and Their Relation to Rock Mechanical Properties and Surface Seismic Data*, SPE Paper 20557, presented at the 65th annual SPE meeting, New Orleans, La., Sep. 23–26, 1990.

J. Tittman, Geophysical Well Logging (Excerpted from Methods of Experimental Physics, vol. 24: *Geophysics*).

J. E. White, Underground Sound, pp. 139–191, Elsevier, 1983.

D. M. Williams, J. Zemanek, F. A. Angona, C. L. Dennis, and R. L. Caldwell, The Long Spaced Acoustic Logging Tool (Transactions of the SPWLA 25th Annual Logging Symposium, Paper T, 1984).

K. Ellefsen et al., *Estimating Phase Velocity and Attenuation of Guided Waves from Acoustic Logging Data*, paper presented at the 57th Annual International SEG Meeting, New Orleans, pp. 665–667 (Oct. 15–17, 1987).

K. Hsu, A. Brie, and R. Plumb, A New Method for Fracture Identification Using Sonic Array Tools (Paper presented at the 1985 Annual Technical Conference and Exhibition of the Society of Petroleum Engineers of AIME, Sep. 22–25, 1985, publication No. SPE 14397).

O. Y. Liu, Stoneley Wave-Derived $\Delta t$ Shear Log (Paper presented at the SPWLA Twenty-Fifth Annual Logging Symposium, Jun. 10–13, 1984).

J. L. Stevens and S. M. Day, Shear Velocity Logging in Slow Formations Using the Stoneley Wave (Borehole Geophysics Abstract No. BHG7 of the Extended Abstracts of the Annual Meeting of the Society of Exploration Geophysicists, Sep. 1983).

D. Schmitt, *Shear wave logging in elastic formations*, J. Acoust. Soc. Am. 84 (6), Dec. 1988, pp. 2215–2229.

K. Ellefsen et al., *Estimate phase velocity and attenuation of guided waves in acoustic logging data*, Geophysics, vol. 54, No. 8 (Aug. 1989), pp. 1054–1059.

G. Winbow, *A theoretical study of acoustic S-wave and P-wave velocity logging with conventional and dipole sources in soft formations, Geophysics, vol. 53, No. 10 (Oct. 1988), pp. 1334–1342.*

B. P. Lathi, Signals, Systems and Communication (1965), p. 111, p. X, and the title page.

H. Leslie and F. Mons, Sonic Waveform Analysis: Applications, presented at the Society of Professional Well Log Analysts (SPWLA) Annual Logging Symposium, New Orleans, Louisana, Jun. 10–13, 1984.

C. Kitsunezaki, *A New Method of Shear-wave Logging*, 45 Geophysics 10, pp. 1489–1506 (Oct., 1980).

K. Tanaka, S. Inoue and K. Ogure, Development of a Suspension PS Logging System's Seismic Source for Hard Ground, presented at the 56th SEG Annual Meeting, Houston, Texas, Nov. 2–6, 1986.

J. Zemanek, F. Angona, D. Williams and R. Caldwell, Continuous Acoustic Shear Wave Logging, presented at the 35th SPWLA Logging Symposium, New Orleans, 1984.

W. Benzing, Experimentation in Downhole Shear Wave Velocity Measurements, presented at the SEG Annual Meetings, Las Vegas, Nevada, Sep. 11–15, 1983.

G. Nunn and W. Currie, Bender-Bar Transducers for Earth Acoustic Measurements, presentation at the Interwell Seismic Surveying Workshop, Los Alamos, New Mexico, Mar. 24–26, 1988.

A. Kurkjian and S. Chang, *Acoustic Multipole Sources in Fluid-Filled Boreholes*, 51 Geophysics 1 (Jan., 1986), pp. 148–163.

S. L. Marple, Jr., Digital Spectral Analysis, pp. 303–349, Prentice Hall, 1987.

Capon, Greenfield and Kolker, *Multidimensional Maximum Likelihood Processing of a Large Aperture Seismic Array*, 55 Proceedings of the IEEE 192–211 (1967).

L. Baker and G. Winbow, *A Multipole P-wave Logging in Formations Altered by Drilling, 53 Geophysics (Sep., 1988), Appendix A, pp. 1207–1218.*

R. Hamming, Numerical Methods for Scientists and Engineers, 2d Ed. (1973), pp. 68–70.

R. Wiggins, The General Linear Inverse Problem: Implications of Surface Wave and Free Oscillations for Earth Structure, 10 Review of Geophysics and Space Physics (1972), pp. 251–285.

METHODS AND APPARATUS FOR SIMULTANEOUS COMPRESSIONAL, SHEAR AND STONELEY LOGGING

BACKGROUND OF THE INVENTION

1. Field of the Invention

The present invention relates to sonic logging in a borehole traversing an earth formation, and particularly to logging compressional, shear and Stoneley modes of sonic propagation in a single logging operation.

2. Background Information

One type of existing sonic tool used in borehole logging employs a monopole sending transducer for transmitting pulses of sonic energy covering a broad frequency bandwidth which induce propagation of sonic waves in the borehole and surrounding formation. Energy of the sonic waves is detected at each of an array of monopole receiver transducers to produce a set of received signals. A "first motion" detection method is applied if only the formation compressional wave velocities are to be measured, or the entire time-domain waveforms of the set of received signals are recorded if data are needed for compressional, shear and Stoneley waves.

A logging tool of this type is described, for example, in C. MORRIS et al., *A New Sonic Array Tool for Full Waveform Logging*, SPE Paper 13285, presented at the 59th Annual Technical Conference and Exhibit of the SPE, Houston, Tex., 16–19 September 1984. This paper describes a monopole array sonic waveform logging tool and processing procedures for compressional waves, shear waves (in "fast" formations, i.e., hard rocks), and Stoneley waves. Full waveforms are recorded in time domain, as shown in the examples of FIG. 4 of the paper. Compressional (P), shear (S), and Stoneley slowness logs are obtained by processing the time-domain waveforms.

An example of a monopole sonic source transducer intended for generating compressional as well as shear waves is described in U.S. Pat. No. 4,383,591 to Ogura. Time-domain recording of full waveforms is employed.

Monopole tools have not proven entirely satisfactory for acquisition of formation shear data, especially since the shear log can be missing in certain regions of the borehole due to "slow" formations. (A "slow" formation has a shear velocity less than the borehole fluid compressional velocity.) Accordingly, a second type of sonic tool, a dipole shear tool, is added to the monopole sonic tool. Dipole shear tools employ dipole source and dipole receiver transducers (rather than monopole source and monopole receiver transducers) for direct logging of shear in both "fast" and "slow" formations. Pulses of sonic energy covering a suitable frequency bandwidth are transmitted by the dipole source transducer to induce propagation of shear waves in the formation, and energy of the shear waves is detected at each of an array of dipole receiver transducers to produce a set of received dipole signals. The entire time-domain waveforms of the set of received dipole signals are recorded.

One approach to logging P and S waves simultaneously in unconsolidated (soft) rocks is described in U.S. Pat. No. 4,383,308 to Caldwell. Shear-wave data are obtained from time-domain dipole measurements, and compressional-wave data are obtained from time-domain monopole measurements. Because the measurements are made in the time domain, special arrangement of the source-receiver spacings and special source transducer firing sequences are required to measure P and S waves in the same logging run. This method is impractical for simultaneous acquisition because the monopole and dipole waves can sometimes interfere with each other due to imperfect borehole conditions such as tool eccentering and non-circular boreholes. It also limits the choice of source to receiver spacing for each measurement.

Another approach to logging P and S waves simultaneously is disclosed in U.S. Pat. No. 4,516,228 to Zemanek. In this approach, time-domain waveforms are obtained by alternately firing and receiving dipole and monopole waveforms using bimorph bender transducers.

Yet another approach to logging multiple sonic propagation modes with one tool is described in U.S. Pat. No. 3,475,722 to White and in J. WHITE, *The Hula Log: A Proposed Acoustic Tool*, paper presented at the SPWLA Meeting, 1967. The proposed tool has sets of transducers in contact with the borehole wall which are capable several different types of measurements by generating monopole, dipole and torsional waves to acquire time-domain waveforms. Simultaneous acquisition of the various measurements is not disclosed.

The DSI ™ tool recently commercialized by Schlumberger combines monopole and dipole transducers in a single tool to log for compressional, shear and Stoneley waves in the borehole. This tool is suitable for logging both soft ("slow") and hard ("fast") formations. The DSI ™ tool is described, for example, in A. HARRISON et al., *Acquisition and Analysis of Sonic Waveforms from a Borehole Monopole and Dipole Source for the Determination of Compressional and Shear Speeds and Their Relation to Rock Mechanical Properties and Surface Seismic Data*, SPE Paper 20557, presented at the 65th annual SPE meeting, New Orleans, La., Sep. 23–26, 1990. To get the complete logs, the monopole and dipole transmitters are fired separately at separate times. Large amounts of time-domain waveform data are recorded and transmitted uphole. Signal processing to extract wave velocities from the arrays of waveforms is done uphole, using computers in the logging unit or at offsite computing facilities.

Time domain waveform recording for P, S and Stoneley wave logging, whether monopole or dipole, involves a large amount of data to digitize, transmit, store, and process. For example, the DSI ™ tool has an array of 8 receivers, and can record dipole waveforms as well as monopole waveforms in high-, low-, and mid-frequency ranges. At least 512 time samples are taken of the waveform from each receiver, each sample being digitized at 12 bit resolution. The total waveform data for one receiver array per depth point in the borehole is thus $8 \times 512 \times 12/8$ bytes, which is about 6 kbytes per depth point.

Following are the data acquisition modes of the DSI ™ tool, and the corresponding quantities of data acquired per depth point in each mode:

Time-domain Dipole Array Waveforms $\approx 6$ kbytes/depth-point

Time-domain Monopole Stoneley Waveforms $\approx 6$ kbytes/depth-point

Time-domain Monopole P & S Waveforms $\approx 6$ kbytes/depth-point

Digital First-Motion Detection $\approx 0.08$ kbytes/depth-point

If any two of the waveform acquisition modes are logged simultaneously, the amount of time-domain waveform data that must be sent uphole will total more than 12 kBytes/depth-point. (The data handling requirements for compressional-wave "first motion" detection are more modest than those for full time-domain waveforms. See, for example, the techniques described in U.S. Pat. No. 4,985,873 to Eyl et al.)

Several factors must be considered in handling the acquired time-domain waveform data:

(a) Telemetry Rate and Logging Speed. For example, if the logging speed is 2400 ft/hour and the depth points are at 6-inch intervals, then the telemetry rate needed to handle two time-domain waveform logs (e.g., dipole array waveforms and monopole Stoneley waveforms) is at least 128 kBits/second (2 logs × 6 kbytes/depth-point × 8 bits/byte × 2400 ft/hour × 2 depth-points/ft × 1/3600 hr/sec). Even with a high data rate telemetry system, this amount of time-domain waveform data occupies the majority of the telemetry channel capacity.

(b) Data Storage. For example, in a depth section of 10,000 ft with depth-points at 6-inch intervals, there are 20,000 depth points. With the DSI TM tool's time domain waveform acquisition, about 240 MBytes of data must be stored and handled for the sonic logs of two waveform acquisition modes in this example.

(c) Processing. Even with the processors available in the Schlumberger's computerized CSU TM and MAXIS TM logging units, a major portion of the processing capacity can be consumed in handling the time-domain waveforms.

The demands of handling the time-domain waveforms acquired with a logging tool such as the DSI TM can limit the logging speed as well as the combinability of the tool with other logging tools. Since rig time is often expensive, logging speed and avoidance of another logging run is an important consideration.

SUMMARY OF THE INVENTION

It is an object of the present invention to provide methods and apparatus for borehole logging in which the aforementioned disadvantages of the prior art are avoided. In particular, it is an object of the present invention to provide for simultaneous logging of multiple sonic-wave propagation modes, such as compressional and Stoneley, compressional and shear, Stoneley and shear, or compressional with Stoneley and shear.

It is a further object of the present invention to provide methods and apparatus for borehole logging in which frequency-domain logging of Stoneley and/or shear waves is employed to significantly reduce the quantities of acquired data in comparison with time-domain waveform logging of Stoneley and shear waves.

These and other objects of the present invention will become apparent from the description which follows with reference to the accompanying drawing.

In accordance with the invention, time-domain measurements and frequency-domain measurements can be acquired simultaneously, and the individual measurements can be separated by frequency filtering. Also in accordance with the invention, monopole (Stoneley) data and dipole (shear) data can be acquired simultaneously by discrete-frequency logging; cross-mode interference can be avoided by using distinct frequencies for monopole and dipole emissions.

Further in accordance with the invention, compressional-wave, Stoneley-wave and shear-wave data can be acquired simultaneously by compressional-wave logging in the time domain using intermittent continuous-frequency (e.g., pulsed) emission of monopole sonic energy, Stoneley-wave logging in the frequency domain using substantially continuous emission of discrete-frequency monopole energy, and shear-wave logging in the frequency domain using substantially continuous emission of discrete-frequency dipole energy. By keeping the frequency spectrum of the monopole continuous-frequency emissions within a band distinct from the discrete-frequency emissions, interference between the time-domain and the frequency-domain logs can be avoided. By using frequencies for discrete-frequency monopole Stoneley logging which are distinct from the frequencies used for discrete-frequency dipole shear logging, interference between the two discrete-frequency logs can be avoided.

In a preferred embodiment, the methods and apparatus of the invention combine discrete-frequency dipole sonic emission at low frequency (up to 5 kHz) to log formation shear wave, high frequency (5 to 30 kHz) time-domain monopole emission with first-motion detection to log formation compressional wave, and discrete-frequency monopole emission at low frequency (below 5 kHz) to log borehole Stoneley wave.

Since the discrete-frequency logs and the first-motion detection log require that only a modest amount of data be acquired and processed, the measurements of compression, shear and Stoneley can be made simultaneously and transmitted uphole using a small telemetry bandwidth. The benefits include higher logging speed, acquisition of all three measurements in a single logging run, real-time acquisition and processing of the three measurements, a reduced telemetry load which allows a tool making these three measurements to be combined with other logging tools.

DETAILED DESCRIPTION OF THE PREFERRED EMBODIMENTS

Figure 1:
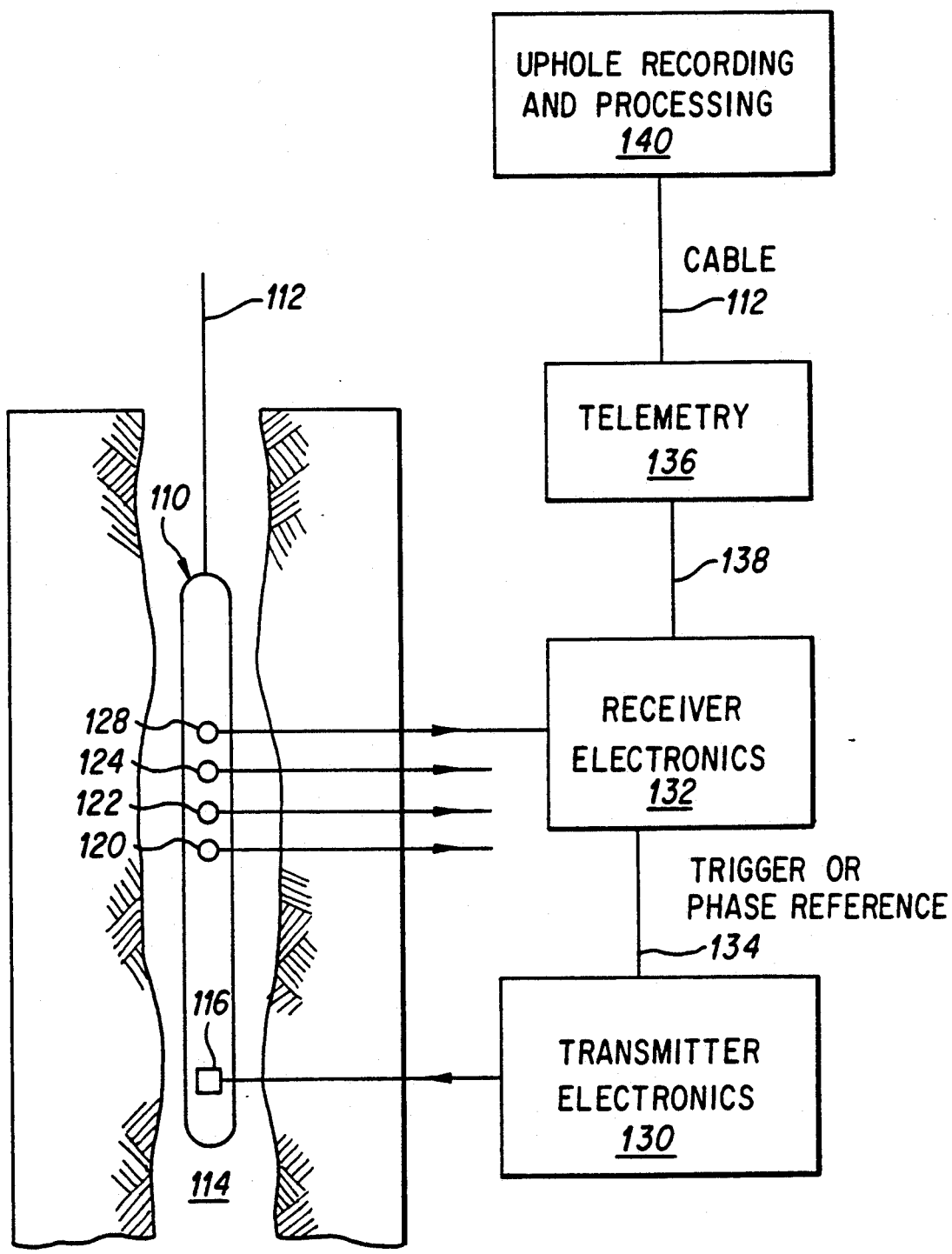
FIG. 1 shows in schematic block form a general illustration of a sonic logging apparatus in accordance with the present invention.

The present invention provides logging methods and tool combinations to simultaneously log compressional and shear waves, or compressional and Stoneley waves, or shear and Stoneley waves, or compressional, shear and Stoneley waves, in one logging run. Monopole compressional waves are logged simultaneously with dipole shear and/or monopole Stoneley waves by mixing time domain and frequency domain acoustic data. Dipole shear and monopole Stoneley waves are preferably logged simultaneously by using distinct, discrete frequencies to avoid cross-mode interference. The proposed methods and tools are based on combinations of the following three configurations:

1. First-motion detection for logging formation compressional wave. Monopole sonic waves are emitted at high frequencies, e.g., above 5 kHz for commonly-encountered borehole conditions. Compressional-wave "first motion" detection can be implemented in any suitable manner. Compressional-wave first motion detection techniques are known, for example, from U.S. Pat. No. 4,985,873 to Eyl et al., which is incorporated herein by this reference. Alternatively, the high-frequency compressional waveform may be recorded in time domain for later processing of compressional arrivals.
2. Discrete-frequency, dipole shear logging of formation shear waves. The preferred frequencies are less than 5 kHz for shear logging for commonly-encountered borehole conditions. Discrete-frequency shear-wave logging can be implemented, for example, as disclosed in copending U.S. patent application Ser. No. 07/513,319, filed Apr. 20, 1990, now U.S. Pat. No. 5,077,697, issued Dec. 31, 1991, for "Discrete-Frequency Multipole Sonic Logging Methods and Apparatus," which is incorporated herein by this reference.
3. Discrete-frequency, monopole logging of borehole Stoneley waves. The preferred frequencies for Stoneley wave logging are less than 5 kHz for commonly-encountered borehole conditions. Discrete-frequency Stoneley-wave logging can be implemented, for example, as disclosed in copending U.S. patent application Ser. No. 07/513,347, filed Apr. 20, 1990, and now abandoned for "Methods and Apparatus for Discrete-Frequency Tube-Wave Logging of Boreholes," which is incorporated herein by this reference.

The present invention allows the compressional, shear and Stoneley waves to be emitted simultaneously by mixing the waves together in such a manner that the waveforms at the receiver outputs can be discriminated. This can be achieved in the following way:

1. The high-frequency compressional wave pulses are emitted at preselected time intervals or depth intervals. A high-pass filter is applied to the waveforms from the receivers before performing first-motion detection. Since the discrete-frequency emissions of dipole shear and monopole Stoneley energy are lower in frequency, the high-pass filter removes interferences from the dipole and Stoneley waveforms.
2. The monopole Stoneley energy is emitted substantially continuously at discrete frequencies. Phase-sensitive detectors (lock-in amplifiers) are used to detect and record the complex values of the received monopole Stoneley waveforms at each selected frequency. The "complex values" of a monopole Stoneley waveform are the amplitude and phase, or real and imaginary parts, of the waveform. The amplitude and phase of the waveform express the complex values of the waveform; this expression is equivalent to the real and imaginary parts of the waveform. Since the high-frequency compressional signals are well separated in frequency from the monopole Stoneley signals, the acquisition of discrete-frequency complex values is not affected by the signals used for first-motion detection.
3. The dipole shear energy is emitted substantially continuously at discrete frequencies. Phase-sensitive detectors (lock-in amplifiers) are used to detect and record the complex pressure response of the received dipole shear waveforms at each selected frequency. The "complex pressure response" of a dipole shear waveform are the amplitude and phase, or real and imaginary parts, of the waveform. The real and imaginary parts of the waveform express the complex pressure response of the waveform; this expression is equivalent to the amplitude and phase of the waveform. Since the high-frequency compressional signals are well separated in frequency from the dipole shear signals, the acquisition of discrete-frequency complex pressure response is not affected by the signals used for first-motion detection. To avoid possible interference from the low-frequency monopole Stoneley signals, the discrete frequencies used for dipole shear logging are preferably distinct from the discrete frequencies used for Stoneley wave logging.

First motion detection is well known, and requires a smaller amount of data to be acquired and processed than do full time-domain waveforms. Discrete-frequency methods also require a smaller amount of data than do full time-domain waveforms. Accordingly, the combinations above can be run simultaneously and still use a reasonably small telemetry bandwidth for transmission of the data to the earth's surface. In addition, the processing requirements are also less than for full waveform logging of the time domain counterparts.

In accordance with preferred embodiments of the invention, time-domain and frequency-domain measurements are simultaneously acquired, and the individual measurements are separated by frequency filtering. Also in accordance with preferred embodiments of the invention, monopole and dipole data are acquired using discrete-frequencies. Cross-mode interference is avoided by using frequencies for monopole logging which are distinct from the frequencies used for dipole logging. Simultaneous acquisition of compressional, shear and Stoneley wave data is thus possible in accordance with the invention.

The present invention can be implemented using any of a variety of transducer sets. Separate transducers can be provided in a sonde for high-frequency monopole, low-frequency monopole, and low-frequency dipole logging. Alternatively, separate transducers can be provided in a sonde for wide-band monopole and low-frequency dipole logging. For example, wide band monopole transducers can be used for both Stoneley and compressional logging. Or, dual-purpose monopole/dipole transducers can be used in a sonde for shear, Stoneley and compressional logging. For example, special transducers can be designed which behave like a monopole and a dipole, depending on how they are connected.

Compressional first-motion detection methods are well known. A traditional analog/digital method is described, for example, in J. TITTMAN, GEOPHYSICAL WELL LOGGING (Excerpted from METHODS OF EXPERIMENTAL PHYSICS, Volume 24: *Geophysics*), 1986, pp. 153-154. A more recent digital array method is disclosed in A. HARRISON et al., *Acquisition and Analysis of Sonic Waveforms from a Borehole Monopole and Dipole Source for the Determination of Compressional and Shear Speeds and Their Relation to Rock Mechanical Properties and Surface Seismic Data*, SPE Paper 20557, presented at the 65th annual SPE meeting, New Orleans, La. Sep. 23-26, 1990, and in U.S. Pat. No. 4,985,873 to Eyl et al.

FIG. 1 shows in schematic block form a general illustration of a sonic logging apparatus in accordance with the present invention. Referring to FIG. 1, an acoustic logging sonde 110 is suspended by a cable 112 in a borehole 114 in the earth. Borehole 114 is filled with drilling mud or other fluids (not illustrated). Logging sonde 110 includes one or more sending, or source, transducers 116 and an array of receiving transducers 120-128 arrayed at locations spaced apart from one another and from sending transducer(s) 116 along sonde 110. While FIG. 1 shows four receiving transducers, it will be appreciated that any number may be used.

Transmitter electronics 130 generates signals to drive sending transducer(s) 116, and provides trigger and/or phase reference signals to receiver electronics 132 via a communication channel 134. Driving the sending transducer(s) 116 causes sonic energy to be emitted in the borehole which induces propagation of sonic waves in the borehole and the surrounding formation. The sonic waves are detected at receiving transducers 120-128, and the signal outputs of the receiving transducers are supplied to receiver electronics 130. Receiver electronics 130 processes the receiver signals and supplies data to conventional telemetry circuity 38 which preferably transmits the data to uphole recording and processing equipment via cable 112 or other suitable means. Sending transducer(s) 110, receiver transducers 120-128, transmitter electronics 130, receiver electronics 132, and telemetry circuitry 136 are preferably build into sonde 110.

Some possible configurations of transmitter electronics 130 and sending transducer(s) 116 are shown in more detail in FIGS. 2, 3, 4, 5 and 6. Some possible configurations of receiver electronics 132 and receiver transducers 120-128 are further detailed in FIGS. 7 and 8.

Figure 2:
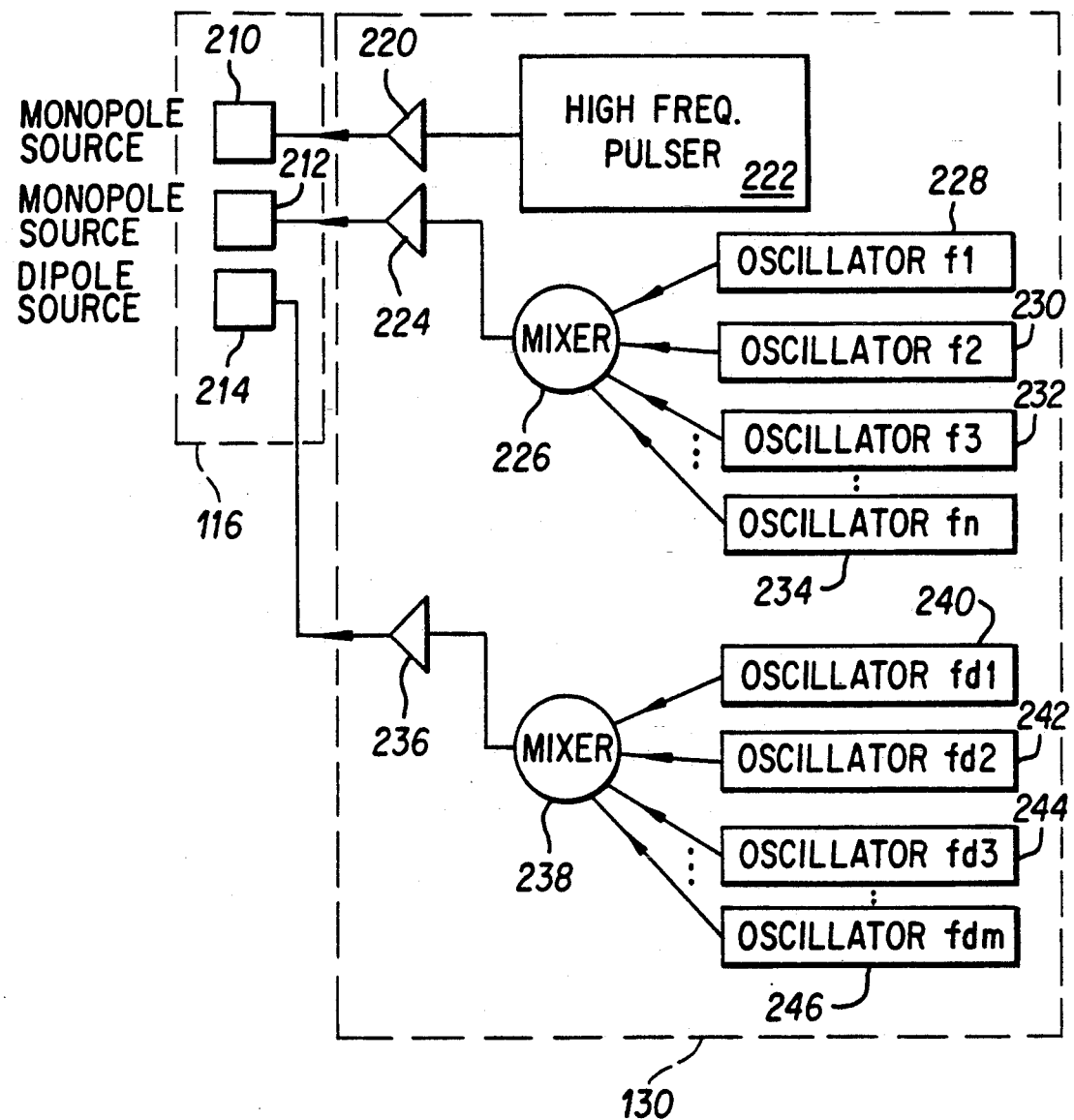
FIG. 2 is a schematic diagram of a first embodiment of the sending transducers and transmitting electronics of FIG. 1 in accordance with the invention.

FIG. 2 shows a first embodiment of the sending transducers 116 and transmitting electronics 130 in accordance with the invention. In this embodiment, the sending transducers 116 comprise a set of three individual transducers, a monopole source transducer 210 for emitting high-frequency monopole sonic energy to induce propagation of compressional waves, a monopole source transducer 212 for emitting low-frequency monopole sonic energy to induce propagation of Stoneley (tube) waves, and a dipole source transducer 214 for emitting dipole sonic energy to induce propagation of dipole shear waves. In the embodiment of FIG. 2, each of the source transducers is separately driven by respective driving electronics. For compressional-wave logging (e.g., first-motion detection logging), monopole source transducer 210 is driven via an amplifier 220 by broad-band pulses from a high-frequency pulser 222. The frequency spectrum of the driving pulses from pulser 222 is chosen to be higher than the highest frequency (fn or fdm) used for Stoneley-wave logging and shear wave logging. A preferred range is from about 5 kHz to about 30 kHz.

For discrete-frequency Stoneley (tube) wave logging, monopole source transducer 212 is driven substantially continuously via an amplifier 224 by a signal from a mixer 226. Mixer 226 is in turn supplied with discrete-frequency signals at frequencies f1, f2, f3, . . . fn from respective narrow-band oscillators 228-234, so that the sonic energy emitted by monopole source transducer 212 contains substantially only the discrete frequencies f1, f2, f3, . . . fn. Each of the discrete frequencies f1, f2, f3, . . . fn lies within a frequency range suitable for inducing propagation of Stoneley (tube) waves in the borehole, i.e., below 5 kHz. The highest of these frequencies, fn, preferably is lower than the lowest frequency of the pulses used for compressional-wave logging. By "substantially continuously" driving transducer 212 is meant that the driving signals are continuous, or are transmitted in bursts of sufficient duration (for example, on the order of 10 to 20 cycles per burst) to approximate a continuous wave for purposes of exciting propagation of Stoneley waves in the borehole at the desired frequencies.

For discrete-frequency shear wave logging, dipole source transducer 214 is driven substantially continuously via an amplifier 236 by a signal from a mixer 238. Mixer 238 is in turn supplied with discrete-frequency signals at frequencies fd1, fd2, fd3, . . . fdm from respective narrow-band oscillators 240-256, so that the sonic energy emitted by dipole source transducer 214 contains substantially only the discrete frequencies fd1, fd2, fd3, . . . fdm. Each of the discrete frequencies fd1, fd2, fd3, . . . fdm lies within a frequency range suitable for inducing propagation of shear waves in the borehole, i.e., up to 5 kHz. The highest of these frequencies, fdm, preferably is lower than the lowest frequency of the pulses used for compressional-wave logging. By "substantially continuously" driving transducer 214 is meant that the driving signals are continuous, or are transmitted in bursts of sufficient duration (for example, on the order of 10 to 20 cycles per burst) to approximate a continuous wave for purposes of exciting propagation of shear waves in the borehole at the desired frequencies.

The frequencies f1, f2, f3, . . . , fn may overlap with frequencies fd1, fd2, fd3, . . . , fdm, but need not do so. It is preferred that discrete frequencies used for monopole and dipole discrete frequency measurements not overlap in order to avoid cross-mode interference between the Stoneley-wave and shear-wave propagation modes.

Figure 3:
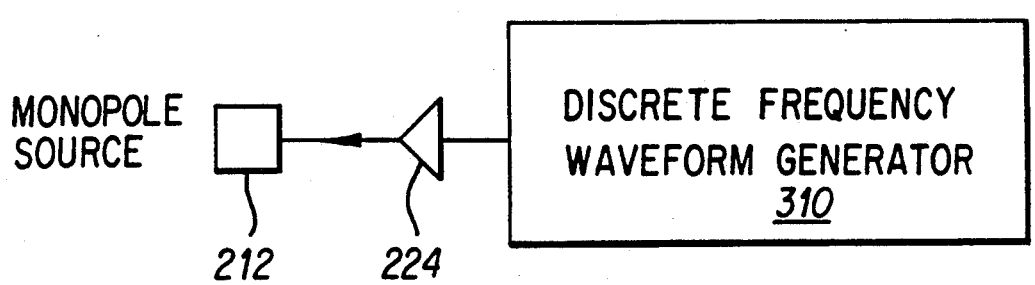
FIG. 3 is a schematic diagram of a variant of a portion of the transmitting electronics of FIG. 2 in accordance with the invention.

FIG. 3 shows a variant of a portion of the transmitting electronics 130 of FIG. 2 in accordance with the invention. In this embodiment, mixer 226 and oscillators 228-234 of FIG. 2 are replaced with a discrete-frequency waveform generator 310. Waveform generator 310 supplies a driving signal whose frequency spectrum has components substantially only at frequencies f1, f2, f3, . . . fn, so that the sonic energy emitted by monopole source transducer 212 contains substantially only the discrete frequencies f1, f2, f3, . . . fn.

Figure 4:
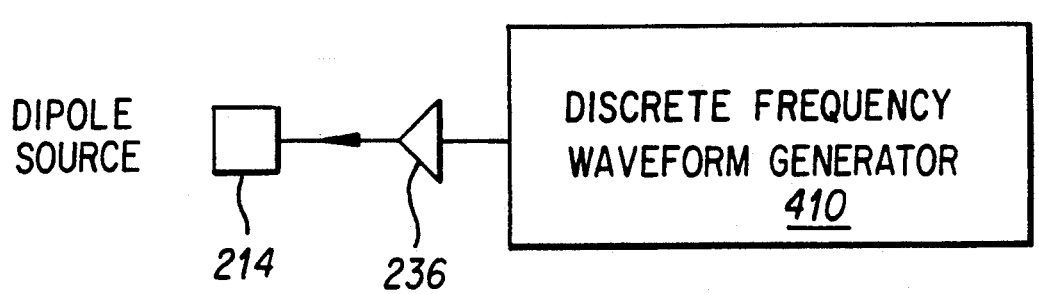
FIG. 4 is a schematic diagram of a further variant of a portion of the transmitting electronics of FIG. 2 in accordance with the invention.

FIG. 4 shows a further variant of a portion of the transmitting electronics 130 of FIG. 2 in accordance with the invention. In this embodiment, mixer 238 and oscillators 240-246 of FIG. 2 are replaced with a discrete-frequency waveform generator 410. Waveform generator 410 supplies a driving signal whose frequency spectrum has components substantially only at frequencies fd1, fd2, fd3, . . . fdm, so that the sonic energy emitted by dipole source transducer 214 contains substantially only the discrete frequencies fd1, fd2, fd3, . . . fdm. The variant of FIG. 3 may be employed with the variant of FIG. 4 if desired. One way to generate the driving signal waveforms with discrete frequency contents is to use digital electronics to generate the desired wave shape and D/A converters to drive the source transducers.

Figure 5:
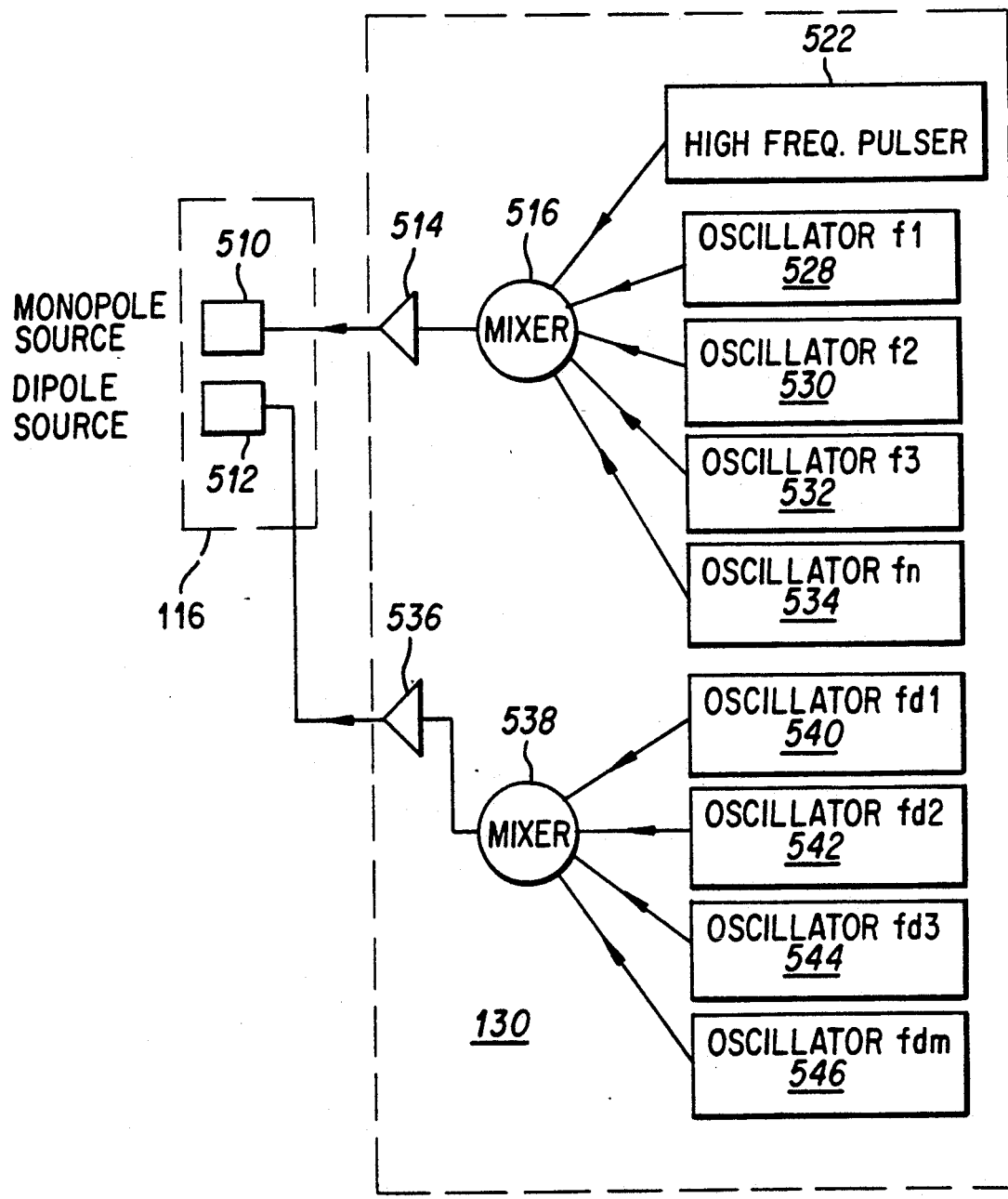
FIG. 5 is a schematic diagram of a further embodiment of the sending transducers and transmitting electronics in accordance with the invention.

FIG. 5 shows a further embodiment of the sending transducers 116 and transmitting electronics 130 in accordance with the invention. In this embodiment, the sending transducers 116 comprise a set of two individual transducers, a monopole source transducer 510 for emitting high-frequency monopole sonic energy to induce propagation of compressional waves and for emitting low-frequency monopole sonic energy to induce propagation of Stoneley (tube) waves, and a dipole source transducer 512 for emitting dipole sonic energy to induce propagation of dipole shear waves. In the embodiment of FIG. 5, monopole source transducer 510 is driven via an amplifier 220 by a signal from a mixer 516.

For compressional-wave logging (e.g., first-motion detection logging), mixer 516 is supplied with broadband pulses from a high-frequency pulser 522. The frequency spectrum of the driving pulses from pulser 522 is chosen as described with reference to FIG. 2. For discrete-frequency Stoneley (tube) wave logging, mixer 516 is supplied with discrete-frequency signals at frequencies f1, f2, f3, . . . fn from respective narrow-band oscillators 528-534. Monopole source transducer can be simultaneously driven via mixer 516 with the high-frequency pulse train of pulser 522 and with the substantially continuous discrete frequencies f1, f2, f3, . . . fn from oscillators 528-534. Frequencies f1, f2, f3, . . . fn are chosen as described with reference to FIG. 2. Oscillators 528-534 can be replaced with a discrete-frequency waveform generator such as generator 310 of FIG. 3 is desired. For discrete-frequency shear wave logging, dipole source transducer 512 is driven substantially continuously via an amplifier 536 with discrete-frequency signals at frequencies fd1, fd2, fd3, . . . fdm. The discrete frequencies may be supplied via a mixer 538 from a set of narrow-band oscillators 540-545 as shown in FIG. 5, or from a discrete-frequency waveform generator such as generator 410 of FIG. 4.

Figure 6:
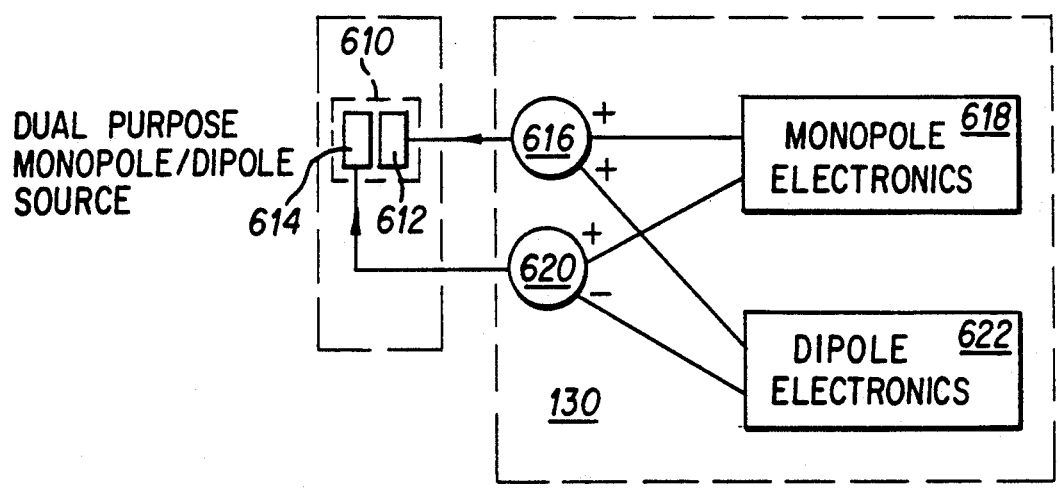
FIG. 6 is a schematic diagram of another embodiment of the sending transducers and transmitting electronics in accordance with the invention.

FIG. 6 shows yet another embodiment of the sending transducers 116 and transmitting electronics 130 in accordance with the invention. In this embodiment, a single sending transducer 610 is employed for simultaneous P, S, and Stoneley logging. A single, dual-purpose monopole and dipole source transducer 610 is used for simultaneous P, S, and Stoneley logging in this embodiment. A first pole 612 of dual-purpose source transducer 610 is driven via a summing circuit 616 with the sum of the signals from monopole driver electronics 618. A second pole 614 of dual-purpose source transducer 610 is driven via a difference circuit 620 with the difference of the signals from monopole driver electronics 622. Monopole electronics 618 may be as shown in FIG. 5, or the oscillators of FIG. 5 may be replaced with the discrete-frequency waveform generator as described above with reference to FIG. 3. Dipole electronics 622 may be as shown in FIG. 5, or may be replace with the discrete-frequency waveform generator as described above with reference to FIG. 4.

Figure 7:
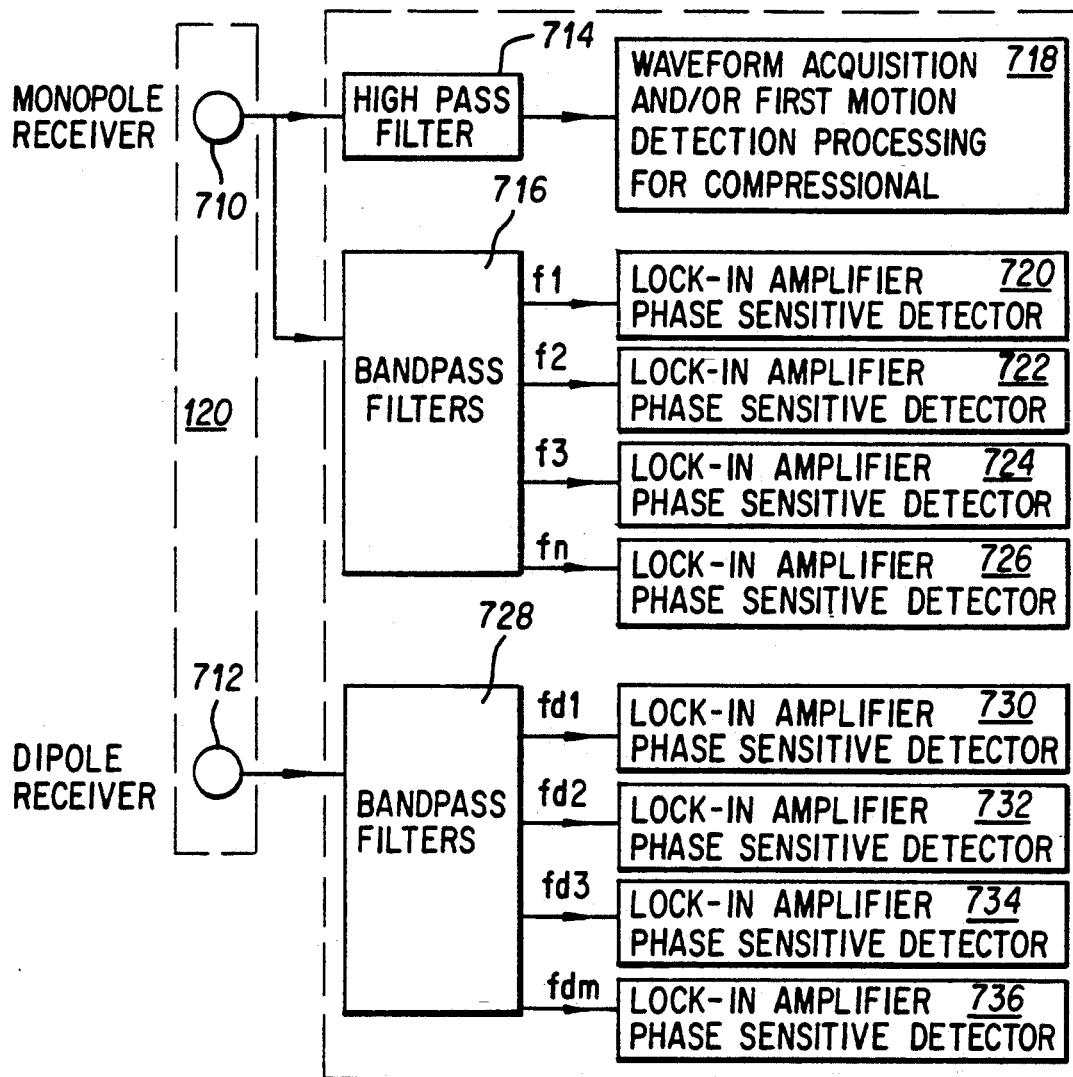
FIG. 7 is a schematic diagram of an embodiment of the receiver transducers and receiver electronics of FIG. 1 in accordance with the invention.

FIG. 7 shows a first embodiment of the receiver transducers 120-128 and receiver electronics 132 in accordance with the invention. In this embodiment, each of the receivers 120-128 comprises a pair of individual transducers: a monopole receiver transducer 710 for receiving the monopole sonic energy of compressional waves and the monopole sonic energy of Stoneley (tube) waves, and a dipole receiver transducer 712 for receiving dipole sonic energy of shear waves. Only one such transducer set (i.e., receiver 120 comprising transducers 710 and 712) is shown in FIG. 7.

The signal from monopole receiver transducer 710 is separated according to frequency bands by a high-pass filter 714 and a set of band-pass filters 716. High-pass filter 714 passes to circuitry 718 that portion of the frequency spectrum of the received signal bearing compressional-wave information, i.e., the portion lying above frequencies fn and fdm. Circuitry 718 may be conventional circuitry for performing "first-motion" detection of the compressional wave and/or acquiring a time-domain compressional waveform. Band-pass filters 716 separate from the monopole receiver signal a set of narrow-band signals corresponding to frequencies f1, f2, f3, . . . fn and bearing Stoneley-wave information. These narrow-band signals are supplied to respective lock-in amplifier and phase-sensitive detector circuits 720-726 which detect the complex pressure response of the received waves at the frequencies f1, f2, f3, . . . fn. The "complex pressure response" is expressed as the amplitude and phase of the received signal, or as the real and imaginary parts of the received signal; they are equivalent expressions.

The signal from dipole receiver transducer 712 is separated according to frequency bands by a set of band-pass filter 728. Band-pass filters 728 separate from the dipole receiver signal a set of narrow-band signals corresponding to frequencies fd1, fd2, fd3, . . . fdm and bearing dipole shear-wave information. These narrow-band signals are supplied to respective lock-in amplifier and phase-sensitive detector circuits 730-736 which detect the complex values of the received dipole signal at the frequencies fd1, fd2, fd3, . . . fdm. The "complex values" are expressed as the amplitude and phase of the received signal, or as the real and imaginary parts of the received signal; they are equivalent expressions.

The embodiment of FIG. 7 may be modified by substituting for monopole receiver 710 a pair of monopole receivers, with the signal from a first monopole receiver being supplied to high-pass filter 714 and the signal from a second monopole receiver being supplied to band-pass filters 716. With this modification, compressional-wave information is derived from the first monopole receiver signal, and Stoneley-wave information is derived from the second monopole receiver signal.

Figure 8:
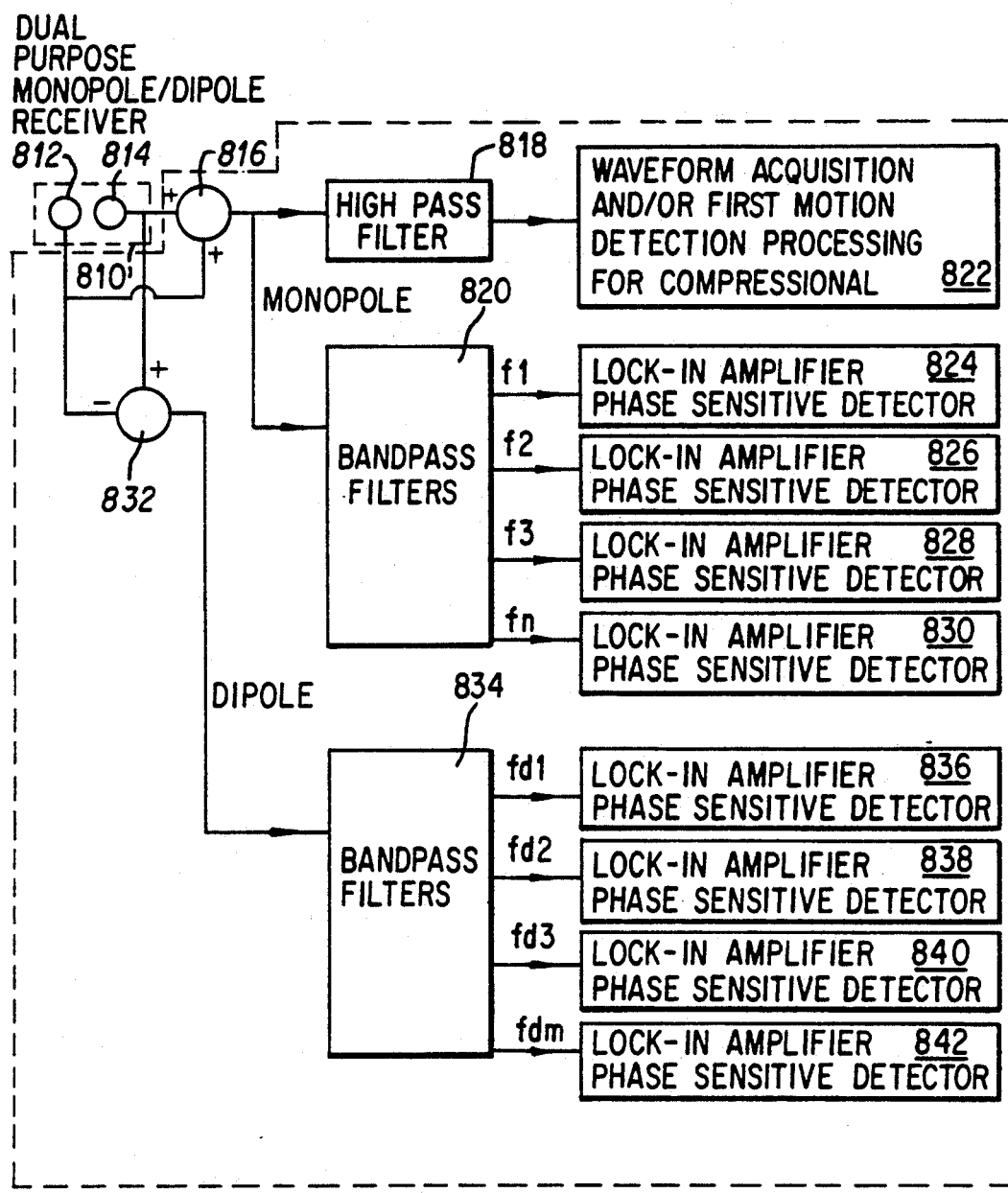
FIG. 8 is a schematic diagram of a further embodiment of the receiver transducers and receiver electronics in accordance with the invention.

FIG. 8 shows a further embodiment of the receiver transducers 120-128 and receiver electronics 132 in accordance with the invention. In this embodiment, each of the receivers 120-128 comprises a dual-purpose monopole/dipole receiver transducer 810 for simultaneously receiving the monopole sonic energy of compressional waves, the monopole sonic energy of Stoneley (tube) waves, and the dipole sonic energy of shear waves. The monopole and dipole components of the received signals are separated by the polarity of the two sides of the transducers. Only one such transducer is shown in FIG. 8. For each dual-purpose receiver transducer, a respective summing circuit 816 adds the signal from a first pole 812 of transducer 810 to the signal from a second pole 814 of transducer 810. The sum signal from circuit 816 is separated according to frequency bands by a high-pass filter 818 and a set of band-pass filters 820. High-pass filter 818 passes to circuitry 822 that portion of the frequency spectrum of the sum signal bearing compressional-wave information, i.e., the portion lying above frequencies fn and fdm. Circuitry 820 may be conventional circuitry for performing "first-motion" detection of the compressional wave and/or acquiring a time-domain compressional waveform. Band-pass filters 820 separate from the sum signal a set of narrow-band signals corresponding to frequencies f1, f2, f3, ... fn and bearing Stoneley-wave information. These narrow-band signals are supplied to respective lock-in amplifier and phase-sensitive detector circuits 824–830 which detect the complex pressure response of the received waves at the frequencies f1, f2, f3, ... fdn.

Also for each dual-purpose receiver transducer, a difference circuit 832 takes the difference between the signal from pole 812 of transducer 810 and the signal from pole 814 of transducer 810. The difference signal from circuit 832 is separated according to frequency bands by a set of band-pass filters 834, to produce a set of narrow-band signals corresponding to frequencies fd1, fd2, fd3, ... fdm and bearing dipole shear-wave information. These narrow-band signals are supplied to respective lock-in amplifier and phase-sensitive detector circuits 836–842 which detect the complex values of the difference signal at the frequencies fd1, fd2, fd3, ... fdm.

Figure 9:
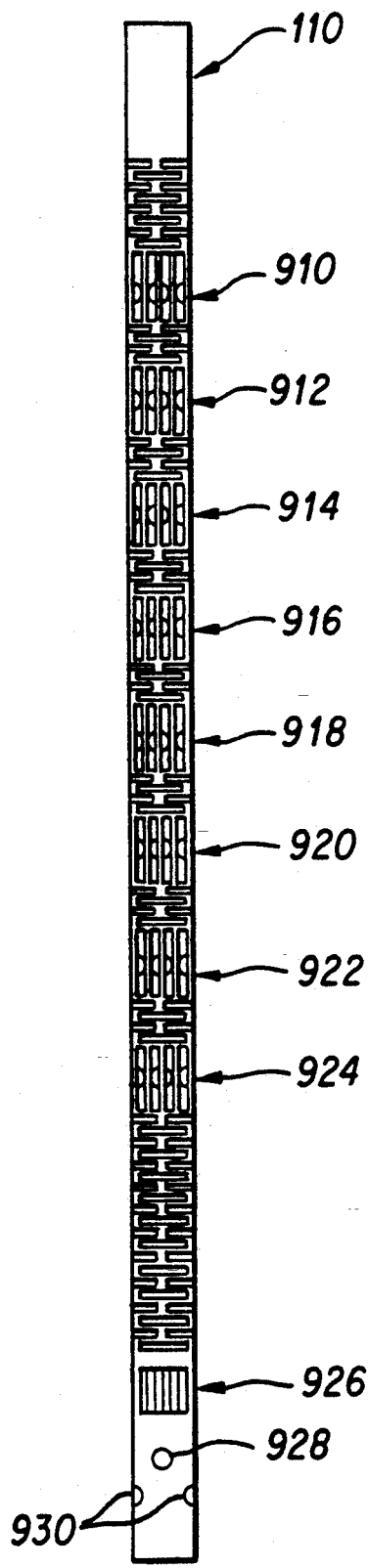
FIG. 9 shows in elevation view one possible configuration of a sonde in accordance with the invention.

FIG. 9 shows a side view of one possible configuration of a sonde 110 in accordance with the invention. In this embodiment, the receiver array comprises eight receiver stations 910–924 spaced apart along the sonde body. Each receiver station comprises a set of monopole and dipole receivers as explained above with reference to FIG. 7, or a dual-purpose monopole/dipole receiver as explained above with reference to FIG. 8. Along the lower end of the sonde body are mounted one or more monopole source transducers 926 and a pair of dipole source transducers 928, 930. As illustrated, dipole source transducers 928 and 930 are "crossed" for emitting dipole sonic energy in mutually-orthogonal directions. If desired, only one dipole source transducer may be provided. Also, the monopole source transducer(s) 926 may be eliminated, and the dipole transducers 928 and/or 930 replaced with one or more dual-purpose monopole/dipole source transducers as explained with reference to FIG. 6.

Figure 10:
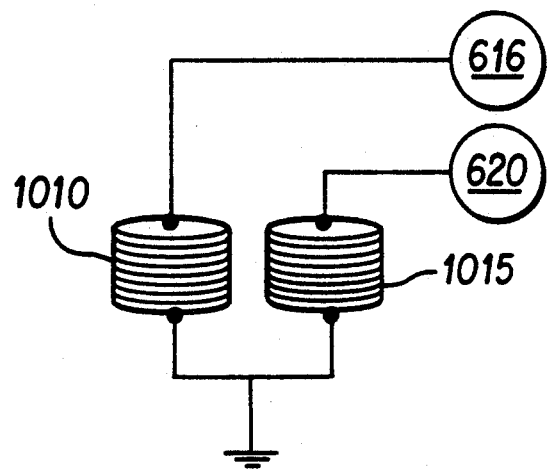
FIG. 10 shows one possible configuration of a dual-purpose monopole and dipole transducer.
Figure 11:
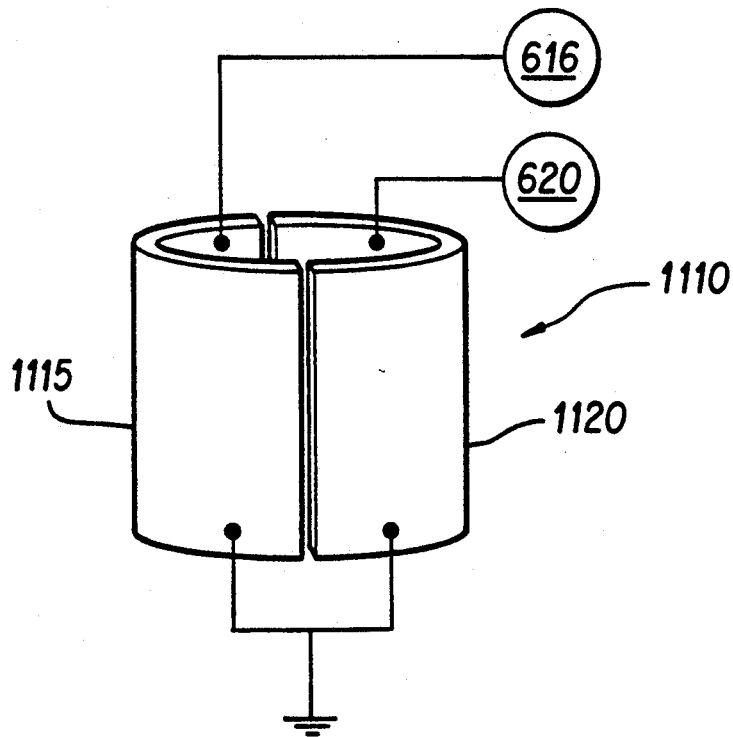
FIG. 11 shows another possible configuration of a dual-purpose monopole and dipole transducer.

One way to realize a dual-purpose monopole/dipole transducer useful in practicing the present invention is to use two stacks of piezoelectric ceramic transducers 1010, 1015, as shown in FIG. 10. When used as a source transducer, one electrode of each stack is connected to a common port (or ground), and the other electrode of each stack is connected to the respective driving port, e.g., of summing circuit 616 or difference circuit 620. The individual elements of the stack may be connected in any of several different ways. Another way to realize a dual-purpose monopole/dipole transducer is to use a cylindrical piezoelectric ceramic transducer 1110 that is split into segments 1115, 1120, as shown in FIG. 11. One electrode (internal, or external) of each segment is connected to a common port or ground. When used as a source transducer, the other electrode of each segment (external, or internal) is connected to the respective driving port, e.g., of summing circuit 616 or difference circuit 620. A third way to realize a dual-purpose monopole/dipole transducer is to use magnetostrictive transducer elements as described in S. COHICK et al., *Rare-earth iron "square-ring" dipole transducer*, J. ACOUST. SOC. AM. 72(2), pp. 313–315, August 1982. The four rare-earth rods can be driven to expand simultaneously as a monopole source. They can also be driven as shown in the COHICK et al. paper to become a dipole source.

Advantages of using the methods and apparatus of the invention can be readily seen from comparison with a prior-art sonic tool such as the DSI ™ tool. It was noted above that the DSI ™ tool has an array of 8 receivers. Assuming that 512 time samples are taken of the waveform from each receiver, and that each sample is digitized at 12-bit resolution, the waveform data for one receiver array is about 6 kbytes per depth point:

DSI Dipole Array Waveforms≈6 kbytes/depth-point

DSI Monopole Stoneley Waveforms≈6 kbytes/depth-point

DSI Monopole P & S Waveforms≈6 kbytes/depth-point

DSI Digital First-Motion Detection≈0.08 kbytes/depth-point

For a depth section of 10,000 ft with depth points at 6-inch intervals, the data for each waveform acquisition mode totals about 120 Mbytes. That is, to log a 10,000 ft section of the borehole with the DSI ™ tool, assuming the foregoing parameters, the dipole logs total about 120 Mbytes, the Stoneley logs total about 120 Mbytes, and the P & S logs total about 120 Mbytes. Digital "first-motion" detection with the DSI ™ tool involves substantially less data, with 10 bytes per receiver per depth point, or about 1.6 Mbytes for a 10,000 foot section of borehole at two depth points per foot.

In contrast, the present invention offers substantially reduced quantities of data. Assuming 10 discrete frequencies for each of the dipole shear and the monopole Stoneley logs, 8 receivers, and 16-bit digitization for the real and imaginary parts (or the amplitude and phase), requires 8×10×4 bytes, which is about 0.32 kBytes/depth-point per array. The data acquired in monopole compressional "first motion" detection is essentially the same as that acquired in the DSI ™ tool example. That is:

Discrete-frequency Dipole Shear≈0.32 kBytes/depth-point

Discrete-frequency Monopole Stoneley≈0.32 kBytes/depth-point

Monopole Compressional First Motion≈0.08 kBytes/depth-point

For a depth section of 10,000 ft with depth points at 6-inch intervals, the data for each of the discrete frequency acquisition modes totals about 6.4 Mbytes. That is, to log a 10,000 ft section of the borehole with the methods and apparatus of the present invention, assuming the foregoing parameters, the discrete-frequency dipole logs total about 6.4 Mbytes and the discrete-frequency Stoneley logs total about 6.4 Mbytes. The data of the discrete-frequency dipole logs and the discrete-frequency Stoneley logs together total about 12.8 Mbytes (0.64 kBytes/depth-point), which is about one-eighteenth the amount of data acquired with the conventional time-domain methods. Digital "first-motion" detection is essentially the same as with the DSI ™ tool, with 10 bytes per receiver per depth point, or about 1.6 Mbytes for a 10,000 foot section of borehole at two depth points per foot.

Some benefits of the smaller data set are reduced telemetry rate requirement and increased logging speed, reduced requirement for data storage uphole, and reduced processing requirements:

(a) Telemetry rate and Logging Speed. If the logging speed is 2400 ft/hour and the depth points are at 6-inch intervals, then the telemetry rate to handle two frequency-domain logs (e.g., discrete-frequency dipole array and discrete-frequency monopole Stoneley) requires less than 7 kBits/second (2 logs×0.32 kbytes/depth-point×8 bits/byte×2400 ft/hour×2 depth-points/ft×1/3600 hr/sec). Adding compressional first-motion detection brings the required telemetry rate to less than 8 kBits/second, which is only a small fraction of the capacity of the telemetry system in current use in Schlumberger logging systems. The substantially lower data rate requirement allows for higher logging speed, saving rig time. Spare telemetry capacity is available for running other logs in the same logging trip, also saving rig time, and/or for handling data from receiver arrays with a larger number of receivers to improve data quality.

(b) Data Storage. For a depth section of 10,000 ft with depth-points at 6-inch intervals, there are 20,000 depth points. The amount of data to be stored and handled for two frequency-domain logs (e.g., discrete-frequency dipole array and discrete-frequency monopole Stoneley) totals about 13 Mbytes (2 logs×0.32 Mbytes/log×20,000 depth-points). Adding compressional first-motion detection brings the required data storage and handling requirement to less than 15 Mbytes. In contrast, one needs to store and handles about 240 MBytes of data for the sonic logs of two waveform acquisition modes of the prior-art DSI ™ tool. Acquiring the substantially reduced data set in accordance with the invention avoids the need for special storage systems, and saves on data handling costs.

(c) Processing. Acquisition of frequency-domain data using discrete-frequency logging of shear and Stoneley wave in accordance with the invention results not only in much less data, but also in much less processing effort to extract shear and Stoneley information from the reduced data set. The processing is simpler and faster, avoiding the need for a special array processor to process the data. Thus, real-time processing while logging is possible with most logging systems currently in commercial use. Moreover, the potential for downhole processing of shear and Stoneley data is increased.

Examples given (e.g., logging rates, data rates, etc.) are for comparison purposes, and do not necessarily reflect the actual values which may be selected for given logging operation.

The preferred embodiments described above are not intended to be limiting, but are instead intended as merely illustrative of the present invention. Those of skill in the art will recognize that many modifications may be made in the disclosed embodiments without departing from the spirit and scope of the present invention as defined by the following claims.

I claim:

1. A method for sonic logging of a borehole to simultaneously acquire time-domain and frequency-domain measurements of an earth formation surrounding the borehole, comprising the steps of:
   (a) intermittently transmitting pulses of sonic energy in the borehole to thereby induce propagation of compressional waves in the earth formation surrounding the borehole, the transmitted pulses having a frequency spectrum lying above a threshold frequency;
   (b) substantially continuously transmitting discrete-frequency sonic energy in the borehole at a plurality of discrete frequencies lying below the threshold frequency, to thereby induce propagation of waves other than formation compressional waves, the transmission of the discrete-frequency sonic energy overlapping in time the transmission of the sonic pulses;
   (c) receiving, in the borehole, sonic energy of the compressional waves and of the waves other than formation compressional waves;
   (d) separating the received sonic energy by frequencies to produce (1) a received compressional-wave signal having an amplitude which varies with time as a function of compressional-wave propagation in the earth formation, and (2) a plurality of other than formation compressional-wave signals corresponding to the discrete frequencies of the transmitted discrete-frequency sonic energy; and
   (e) detecting amplitude and phase, or real and imaginary parts, of each of the other than formation compressional-wave signals.

2. The method of claim 1, wherein step (a) comprises generating a pulse train signal having energy concentrated in a substantially continuous frequency spectrum lying above the threshold frequency, and driving a source transducer to thereby induce propagation of formation compressional waves.

3. The method of claim 2, wherein step (b) comprises generating a signal at each of the plurality of discrete frequencies to produce a set of discrete-frequency signals, mixing the plurality of discrete frequency signals to produce a mixed signal, and driving a source transducer with the mixed signal to induce propagation of Stoneley waves in the borehole.

4. The method of claim 2, wherein step (b) comprises generating a signal at each of the plurality of discrete frequencies to produce a set of discrete-frequency signals, mixing the plurality of discrete frequency signals to produce a mixed signal, and driving a source transducer with the mixed signal to induce propagation of formation shear waves.

5. The method of claim 2, wherein step (b) comprises generating a waveform signal having a frequency spectrum with energy concentrated at the plurality of discrete frequencies, and driving a source transducer with the mixed signal to induce propagation of Stoneley waves in the borehole.

6. The method of claim 2, wherein step (b) comprises generating a waveform signal having a frequency spectrum with energy concentrated at the plurality of discrete frequencies, and driving a dipole source transducer with the mixed signal to induce propagation of formation shear waves.

7. The method of claim 2, wherein step (b) comprises:
   i. generating a first waveform signal having a frequency spectrum with energy concentrated at a first subset of the plurality of discrete frequencies,
   ii. generating a second waveform signal having a frequency spectrum with energy concentrated at a second subset of the plurality of discrete frequencies, wherein the discrete frequencies of the second subset are distinct from the discrete frequencies of the first subset, iii. driving a source transducer with the first waveform signal to induce propagation of Stoneley waves in the borehole, and iv. driving a source transducer with the second waveform signal to induce propagation of formation shear waves.

8. The method of claim 1, wherein steps (a) and (b) comprise the steps of:

i. generating a waveform signal having energy concentrated over a substantially continuous frequency spectrum lying above the threshold frequency, and having energy concentrated at a plurality of discrete frequencies over a frequency spectrum lying below the threshold frequency, and ii. driving a source transducer with the mixed signal to induce propagation of formation compressional waves and borehole Stoneley waves.

9. Apparatus for sonic logging of a borehole to simultaneously acquire time-domain and frequency-domain measurements of an earth formation surrounding the borehole, comprising:

(a) pulse transmitting means for intermittently transmitting pulses of sonic energy in the borehole to thereby induce propagation of compressional waves in the earth formation surrounding the borehole, the transmitted pulses having a frequency spectrum lying above a threshold frequency;

(b) discrete-frequency transmitting means for substantially continuously transmitting discrete-frequency sonic energy in the borehole at a plurality of discrete frequencies lying below the threshold frequency, to thereby induce propagation of waves other than formation compressional waves, the transmission of the discrete-frequency sonic energy overlapping in time the transmission of the sonic pulses;

(c) means for receiving, in the borehole, sonic energy of the compressional waves and of the waves other than formation compressional waves;

(d) means for separating the received sonic energy by frequencies to produce (1) a received compressional-wave signal having an amplitude which varies with time as a function of compressional-wave propagation in the earth formation, and (2) a plurality of other than formation compressional-wave signals corresponding to the discrete frequencies of the transmitted discrete-frequency sonic energy; and (e) means for detecting amplitude and phase, or real and imaginary parts, of each of the other than formation compressional-wave signals.

10. The apparatus of claim 9, wherein said pulse transmitting means comprises means for generating a pulse train signal having energy concentrated in a substantially continuous frequency spectrum lying above the threshold frequency, and means for driving a source transducer to thereby induce propagation of formation compressional waves.

11. The apparatus of claim 10, wherein said discrete-frequency transmitting means comprises means for generating a signal at each of the plurality of discrete frequencies to produce a set of discrete-frequency signals, means for mixing the plurality of discrete frequency signals to produce a mixed signal, and means for driving a source transducer with the mixed signal to induce propagation of Stoneley waves in the borehole.

12. The apparatus of claim 10, wherein said discrete-frequency transmitting means comprises means for generating a signal at each of the plurality of discrete frequencies to produce a set of discrete-frequency signals, means for mixing the plurality of discrete frequency signals to produce a mixed signal, and means for driving a source transducer with the mixed signal to induce propagation of formation shear waves.

13. The apparatus of method of claim 10, wherein said discrete-frequency transmitting means comprises means for generating a waveform signal having a frequency spectrum with energy concentrated at the plurality of discrete frequencies, and means for driving a source transducer with the mixed signal to induce propagation of Stoneley waves in the borehole.

14. The apparatus of claim 10, wherein said discrete-frequency transmitting means comprises means for generating a waveform signal having a frequency spectrum with energy concentrated at the plurality of discrete frequencies, and means for driving a dipole source transducer with the mixed signal to induce propagation of formation shear waves.

15. The apparatus of claim 10, wherein said discrete-frequency transmitting means comprises:

i. means for generating a first waveform signal having a frequency spectrum with energy concentrated at a first subset of the plurality of discrete frequencies, ii. means for generating a second waveform signal having a frequency spectrum with energy concentrated at a second subset of the plurality of discrete frequencies, wherein the discrete frequencies of the second subset are distinct from the discrete frequencies of the first subset, iii. means for driving a source transducer with the first waveform signal to induce propagation of Stoneley waves in the borehole, and iv. means for driving a source transducer with the second waveform signal to induce propagation of formation shear waves.

16. The apparatus of claim 9, wherein said pulse transmitting means and said discrete-frequency transmitting means comprise:

i. means for generating a waveform signal having energy concentrated over a substantially continuous frequency spectrum lying above the threshold frequency, and having energy concentrated at a plurality of discrete frequencies over a frequency spectrum lying below the threshold frequency, and ii. means for driving a source transducer with the mixed signal to induce propagation of formation compressional waves and borehole Stoneley waves.

17. The apparatus of claim 9, wherein said separating means comprises a high pass filter for passing frequencies above said threshold frequency, and a plurality of bandpass filters, each of said bandpass filters passing a respective one of said discrete frequencies.

18. The apparatus of claim 17, wherein said means for detecting comprises a lock-in amplifier and a phase sensitive detector for each of said discrete frequencies.

19. The apparatus of claim 9, wherein said means for receiving comprises at least one dual-purpose monopole/dipole receiver.

20. The apparatus of claim 9, wherein said means for receiving comprises at least one transducer at each of a plurality of receiver stations, the receiver stations being spaced apart at locations along the borehole.

21. A method for sonic logging of a borehole traversing an earth formation to simultaneously acquire monopole discrete-frequency measurements and dipole discrete-frequency measurements of the formation, comprising the steps of:

(a) substantially continuously transmitting monopole sonic energy in the borehole at a first plurality of discrete frequencies to thereby induce propagation of Stoneley waves in the borehole;

(b) substantially continuously transmitting dipole sonic energy in the borehole at a second plurality of discrete frequencies to thereby induce propagation of shear waves in the borehole wall, wherein the transmission of the dipole sonic energy overlaps in time the transmission of the monopole sonic energy, and wherein each of the second plurality of frequencies is distinct from each of the first plurality of frequencies;

(c) receiving sonic energy of the Stoneley waves and the shear waves in the borehole;

(d) separating the received sonic energy by frequency to produce (1) a plurality of received Stoneley-wave signals corresponding to the discrete frequencies of the transmitted monopole sonic energy, and (2) a plurality of received shear-wave signals corresponding to the discrete frequencies of the transmitted dipole sonic energy;

(e) detecting the complex values of the received Stoneley-wave signals; and (f) detecting the complex pressure response of the received shear-wave signals.

22. The method of claim 21, wherein step (a) comprises the steps of generating a signal at each of the first plurality of discrete frequencies to produce a set of discrete-frequency signals, mixing the set of discrete frequency signals to produce a mixed signal, and driving a source transducer with the mixed signal to induce propagation of Stoneley waves in the borehole.

23. The method of claim 21, wherein step (b) comprises the steps of generating a signal at each of the second plurality of discrete frequencies to produce a set of discrete-frequency signals, mixing the set of discrete frequency signals to produce a mixed signal, and driving a source transducer with the mixed signal to induce propagation of formation shear waves.

24. The method of claim 21, wherein step (a) comprises generating a waveform signal having a frequency spectrum with energy concentrated at the first plurality of discrete frequencies, and driving a source transducer with the mixed signal to induce propagation of Stoneley waves in the borehole.

25. The method of claim 21, wherein step (b) comprises generating a waveform signal having a frequency spectrum with energy concentrated at the second plurality of discrete frequencies, and driving a dipole source transducer with the mixed signal to induce propagation of formation shear waves.

26. Apparatus for sonic logging of a borehole traversing an earth formation to simultaneously acquire monopole discrete-frequency measurements and dipole discrete-frequency measurements of the formation, comprising:

(a) first transmitting means for substantially continuously transmitting monopole sonic energy in the borehole at a first plurality of discrete frequencies to thereby induce propagation of Stoneley waves in the borehole;

(b) second transmitting means for substantially continuously transmitting dipole sonic energy in the borehole at a second plurality of discrete frequencies to thereby induce propagation of shear waves in the borehole wall, wherein the transmission of the dipole sonic energy overlaps in time the transmission of the monopole sonic energy, and wherein each of the second plurality of frequencies is distinct from each of the first plurality of frequencies;

(c) means for receiving sonic energy of the Stoneley waves and the shear waves in the borehole;

(d) means for separating the received sonic energy by frequency to produce (1) a plurality of received Stoneley-wave signals corresponding to the discrete frequencies of the transmitted monopole sonic energy, and (2) a plurality of received shear-wave signals corresponding to the discrete frequencies of the transmitted dipole sonic energy;

(e) means for detecting the complex values of the received Stoneley-wave signals; and (f) means for detecting the complex pressure response of the received shear-wave signals.

27. The apparatus of claim 26, wherein said first transmitting means comprises means for generating a signal at each of the first plurality of discrete frequencies to produce a set of discrete-frequency signals, means for mixing the set of discrete frequency signals to produce a mixed signal, a source transducer, and means for driving the source transducer with the mixed signal to induce propagation of Stoneley waves in the borehole.

28. The apparatus of claim 27, wherein said second transmitting means comprises means for generating a signal at each of the second plurality of discrete frequencies to produce a set of discrete-frequency signals, means for mixing the set of discrete frequency signals to produce a mixed signal, a source transducer, and means for driving the source transducer with the mixed signal to induce propagation of formation shear waves.

29. The apparatus of claim 26, wherein said first transmitting means comprises means for generating a waveform signal having a frequency spectrum with energy concentrated at the first plurality of discrete frequencies, a source transducer, and means for driving the source transducer with the mixed signal to induce propagation of Stoneley waves in the borehole.

30. The apparatus of claim 26, wherein said second transmitting means comprises means for generating a waveform signal having a frequency spectrum with energy concentrated at the second plurality of discrete frequencies, a dipole source transducer, and means for driving the dipole source transducer with the mixed signal to induce propagation of formation shear waves.

31. A method for sonic logging of a borehole to simultaneously acquire time-domain compressional-wave measurements, frequency-domain shear-wave measurements, and frequency-domain tube-wave measurements of a formation surrounding the borehole, comprising the steps of:

(a) intermittently transmitting pulses of monopole sonic energy in the borehole to thereby induce propagation of compressional waves in the earth formation surrounding the borehole, the transmitted pulses having a frequency spectrum lying above a threshold frequency;

(b) substantially continuously transmitting monopole sonic energy in the borehole at a first plurality of discrete frequencies lying below the threshold frequency, to thereby induce propagation of tube waves in the borehole, wherein the transmission of the monopole sonic energy overlaps in time the transmission of the sonic pulses;

(c) substantially continuously transmitting dipole sonic energy in the borehole at a second plurality of discrete frequencies lying below the threshold frequency, to thereby induce propagation of shear waves in the borehole wall, wherein the transmission of the dipole sonic energy overlaps in time the transmission of the sonic pulses, and wherein each of the second plurality of frequencies is distinct from each of the first plurality of frequencies;

(d) receiving sonic energy of the compressional waves, the tube waves, and the shear waves in the borehole;

(e) separating the received sonic energy by frequency to produce a received compressional-wave signal, a plurality of received tube-wave signals corresponding to the discrete frequencies of the transmitted monopole sonic energy, and a plurality of received shear-wave signals corresponding to the discrete frequencies of the transmitted dipole sonic energy;

(f) detecting the complex values of the received tube-wave signals; and (g) detecting the complex pressure response of the received shear-wave signals.

32. The method of claim 31, wherein step (a) comprises generating a pulse train signal having energy concentrated in a substantially continuous frequency spectrum lying above the threshold frequency, and driving a source transducer to thereby induce propagation of formation compressional waves.

33. The method of claim 32, wherein step (b) comprises generating a signal at each of the first plurality of discrete frequencies to produce a set of discrete-frequency signals, mixing the plurality of discrete frequency signals to produce a mixed signal, and driving a source transducer with the mixed signal to induce propagation of Stoneley waves in the borehole.

34. The method of claim 32, wherein step (c) comprises generating a signal at each of the second plurality of discrete frequencies to produce a set of discrete-frequency signals, mixing the plurality of discrete frequency signals to produce a mixed signal, and driving a source transducer with the mixed signal to induce propagation of formation shear waves.

35. The method of claim 32, wherein step (b) comprises generating a waveform signal having a frequency spectrum with energy concentrated at the first plurality of discrete frequencies, and driving a source transducer with the mixed signal to induce propagation of Stoneley waves in the borehole.

36. The method of claim 32, wherein step (c) comprises generating a waveform signal having a frequency spectrum with energy concentrated at the second plurality of discrete frequencies, and driving a dipole source transducer with the mixed signal to induce propagation of formation shear waves.

37. The method of claim 31, wherein steps (a), (b) and (c) comprise the steps of:

i. generating a waveform signal having energy concentrated over a substantially continuous frequency spectrum lying above the threshold frequency, having energy concentrated at the first plurality of discrete frequencies over a frequency spectrum lying below the threshold frequency, and having energy concentrated at the second plurality of discrete frequencies over a frequency spectrum lying below the threshold frequency, and ii. driving a source transducer with the mixed signal to induce propagation of formation compressional waves, formation shear waves and borehole Stoneley waves.

38. Apparatus for sonic logging of a borehole to simultaneously acquire time-domain compressional-wave measurements, frequency-domain shear-wave measurements, and frequency-domain tube-wave measurements of a formation surrounding the borehole, comprising:

(a) first transmitting means for intermittently transmitting pulses of monopole sonic energy in the borehole to thereby induce propagation of compressional waves in the earth formation surrounding the borehole, the transmitted pulses having a frequency spectrum lying above a threshold frequency;

(b) second transmitting means for substantially continuously transmitting monopole sonic energy in the borehole at a first plurality of discrete frequencies lying below the threshold frequency, to thereby induce propagation of tube waves in the borehole, wherein the transmission of the monopole sonic energy overlaps in time the transmission of the sonic pulses;

(c) third transmitting means for substantially continuously transmitting dipole sonic energy in the borehole at a second plurality of discrete frequencies lying below the threshold frequency, to thereby induce propagation of shear waves in the borehole wall, wherein the transmission of the dipole sonic energy overlaps in time the transmission of the sonic pulses, and wherein each of the second plurality of frequencies is distinct from each of the first plurality of frequencies;

(d) means for receiving sonic energy of the compressional waves, the tube waves, and the shear waves in the borehole;

(e) means for separating the received sonic energy by frequency to produce a received compressional-wave signal, a plurality of received tube-wave signals corresponding to the discrete frequencies of the transmitted monopole sonic energy, and a plurality of received shear-wave signals corresponding to the discrete frequencies of the transmitted dipole sonic energy;

(f) means for detecting the complex values of the received tube-wave signals; and (g) means for detecting the complex pressure response of the received shear-wave signals.

39. The apparatus of claim 38, wherein said first transmitting means comprises means for generating a pulse train signal having energy concentrated in a substantially continuous frequency spectrum lying above the threshold frequency, source transducer means for emitting sonic energy when driven, and means for driving the source transducer means to thereby induce propagation of formation compressional waves.

40. The apparatus of claim 39, wherein said second transmitting means comprises means for generating a signal at each of the first plurality of discrete frequencies to produce a set of discrete-frequency signals, means for mixing the plurality of discrete frequency signals to produce a mixed signal, and means for driving the source transducer means with the mixed signal to induce propagation of Stoneley waves in the borehole.

41. The apparatus of claim 39, wherein said third transmitting means comprises means for generating a signal at each of the second plurality of discrete frequencies to produce a set of discrete-frequency signals, means for mixing the plurality of discrete frequency signals to produce a mixed signal, and means for driving the source transducer means with the mixed signal to induce propagation of formation shear waves.

42. The apparatus of claim 39, wherein said second transmitting means comprises means for generating a waveform signal having a frequency spectrum with energy concentrated at the first plurality of discrete frequencies, and means for driving the source transducer means with the mixed signal to induce propagation of Stoneley waves in the borehole.

43. The apparatus of claim 39, wherein said third transmitting means comprises means for generating a waveform signal having a frequency spectrum with energy concentrated at the second plurality of discrete frequencies, and means for driving a dipole source transducer with the mixed signal to induce propagation of formation shear waves.

44. The apparatus of claim 38, wherein said first transmitting means, said second transmitting means and said third transmitting means comprise:
  i. means for generating a waveform signal having energy concentrated over a substantially continuous frequency spectrum lying above the threshold frequency, having energy concentrated at the first plurality of discrete frequencies over a frequency spectrum lying below the threshold frequency, and having energy concentrated at the second plurality of discrete frequencies over a frequency spectrum lying below the threshold frequency, and
  ii. means for driving a source transducer with the mixed signal to induce propagation of formation compressional waves, formation shear waves and borehole Stoneley waves.

* * * * *